(12) United States Patent
Walrath et al.

(10) Patent No.: US 6,279,595 B1
(45) Date of Patent: Aug. 28, 2001

(54) INCREASED FLOW, SPLIT VENTURI VALVE SYSTEM

(75) Inventors: David E. Walrath; William R. Lindberg, both of Laramie; Robert K. Burgess, Sheridan, all of WY (US)

(73) Assignee: Big Horn Valve, Inc., Sheridan, WY (US)

(*) Notice: Subject to any disclaimer, the term of this patent is extended or adjusted under 35 U.S.C. 154(b) by 0 days.

(21) Appl. No.: 09/619,347

(22) Filed: Jul. 19, 2000

Related U.S. Application Data

(60) Division of application No. 08/925,535, filed on Sep. 8, 1997, now Pat. No. 6,109,293, which is a continuation-in-part of application No. 08/637,203, filed on Apr. 24, 1996, now Pat. No. 5,718,257.

(51) Int. Cl.[7] ....................................................... F16K 3/02
(52) U.S. Cl. ............................................. 137/14; 137/360
(58) Field of Search ....................................... 137/14, 360

(56) References Cited

U.S. PATENT DOCUMENTS

| | | |
|---|---|---|
| 194,973 | 9/1877 | Phillips . |
| 222,680 | 12/1879 | Dows . |

(List continued on next page.)

FOREIGN PATENT DOCUMENTS

| | | |
|---|---|---|
| 1147094 | 4/1963 | (DE) . |
| 2638503 | 5/1990 | (FR) . |
| 920698 | 3/1963 | (GB) . |
| 920710 | 3/1963 | (GB) . |

OTHER PUBLICATIONS

Febco® Cross Connection Control Handbook, 1977, pp. 1–12.

(List continued on next page.)

*Primary Examiner*—Gerald A. Michalsky
(74) *Attorney, Agent, or Firm*—Santangelo Law Offices, P.C.

(57) ABSTRACT

The present invention provides an axially-rotated valve which permits increased flow rates and lower pressure drop (characterized by a lower loss coefficient) by using an axial eccentric split venturi with two portions where at least one portion is rotatable with respect to the other portion. The axially-rotated valve typically may be designed to avoid flow separation and/or cavitation at full flow under a variety of conditions. Similarly, the valve is designed, in some embodiments, to produce streamlined flow within the valve. A typical cross section of the eccentric split venturi may be nonaxisymmetric such as a semicircular cross section which may assist in both throttling capabilities and in maximum flow capacity using the design of the present invention. Such a design can include applications for freeze resistant axially-rotated valves and may be fully-opened and fully-closed in one-half of a complete rotation. An internal wide radius elbow typically connected to a rotatable portion of the eccentric venturi may assist in directing flow with lower friction losses. A valve actuator may actuate in an axial manner yet be uniquely located outside of the axial flow path to further reduce friction losses. A seal may be used between the two portions that may include a peripheral and diametrical seal in the same plane.

95 Claims, 3 Drawing Sheets

U.S. PATENT DOCUMENTS

| | | |
|---|---|---|
| 286,508 | 10/1883 | Vadersen et al. . |
| 332,731 | 12/1885 | Miller . |
| 958,079 | 5/1910 | Bennett . |
| 960,675 | 6/1910 | Murphy . |
| 1,317,789 | 10/1919 | Hoar . |
| 1,334,870 | 3/1920 | Lowry . |
| 1,406,191 | 2/1922 | Irving ................... 251/124 |
| 1,443,231 | 1/1923 | McCauley . |
| 1,556,979 | 10/1925 | Uschman . |
| 1,777,434 | 10/1930 | Herzbrun . |
| 2,198,455 | 4/1940 | Mueller et al. ............... 251/150 |
| 2,304,303 * | 12/1942 | Ferguson ............... 137/625.17 X |
| 2,507,467 | 5/1950 | Fredrickson et al. .......... 137/69 |
| 2,508,958 | 5/1950 | Manville ............... 15/129 |
| 2,750,962 | 6/1956 | Kreitchman et al. ........ 137/625.48 |
| 2,767,019 | 10/1956 | Manville ............... 299/58 |
| 2,822,818 | 2/1958 | Breznick ............... 137/454.6 |
| 2,894,695 | 7/1959 | Beltcher et al. ............... 239/443 |
| 2,949,240 | 8/1960 | Koolnis ............... 239/200 |
| 2,977,988 | 4/1961 | Drobilits et al. ........... 137/625.17 |
| 3,073,566 | 1/1963 | Bredtschneider ............... 251/362 |
| 3,096,786 | 7/1963 | Rost ............... 137/596.2 |
| 3,145,010 | 8/1964 | Karr, Jr. ............... 251/210 |
| 3,176,720 | 4/1965 | Donahue ............... 137/625.44 |
| 3,273,851 | 9/1966 | Rosch, Jr. et al. ............... 251/124 |
| 3,424,189 | 1/1969 | Woodford ............... 137/218 |
| 3,506,030 | 4/1970 | Vesco ............... 137/595 |
| 3,521,667 | 7/1970 | Johnson ............... 137/454.6 |
| 3,533,554 | 10/1970 | Mongerson ............... 239/27 |
| 3,736,959 | 6/1973 | Parkison ............... 137/625.17 |
| 3,749,355 | 7/1973 | Paul, Jr. ............... 251/124 |
| 3,762,682 | 10/1973 | Franck ............... 251/124 |
| 3,779,508 | 12/1973 | Paul, Jr. ............... 251/124 |
| 3,848,806 | 11/1974 | Samuelsen et al. ............ 239/265.11 |
| 3,954,250 | 5/1976 | Grace ............... 251/144 |
| 4,022,243 | 5/1977 | Edwards ............... 137/360 |
| 4,066,090 | 1/1978 | Nakajima et al. ............... 137/62 |
| 4,117,856 | 10/1978 | Carlson ............... 137/62 |
| 4,178,956 | 12/1979 | Fillman ............... 137/360 |
| 4,200,124 | 4/1980 | Stratynski et al. ............... 137/885 |
| 4,261,332 | 4/1981 | Stewart ............... 126/420 |
| 4,301,972 | 11/1981 | Rudelick ............... 239/443 |
| 4,316,481 | 2/1982 | Fillman ............... 137/302 |
| 4,475,570 | 10/1984 | Pike et al. ............... 137/218 |
| 4,483,361 | 11/1984 | Jungbert, Sr. ............... 137/301 |
| 4,520,836 | 6/1985 | Hutter, III ............... 137/59 |
| 4,532,954 | 8/1985 | Fillman ............... 137/302 |
| 4,596,377 | 6/1986 | Taylor ............... 251/248 |
| 4,809,732 | 3/1989 | Buehler ............... 137/209 |
| 4,844,116 | 7/1989 | Buehler et al. ............... 137/360 |
| 5,004,157 | 4/1991 | Martell ............... 239/205 |
| 5,355,905 | 10/1994 | Burgess et al. ............... 137/1 |
| 5,413,134 | 5/1995 | Burgees et al. ............... 137/1 |
| 5,476,246 | 12/1995 | Wendel et al. ............... 251/123 |
| 5,573,186 | 11/1996 | Loschelder ............... 239/436 |
| 5,622,203 | 4/1997 | Givier et al. ............... 137/337 |
| 5,718,257 | 2/1998 | Burgess ............... 137/218 |

OTHER PUBLICATIONS

Febco® Backflow Prevention Assemblies, "Backflow Prevention Assemblies: Why They Are Needed", 2 pages.

Watts Regulator advertisement of TWS Hydrant, 1995, 5 pages.

Woodford Mfg. Co. Model B60, 65 and 25 Freezeless Wall Faucets brochure, 1977, 3 pages.

Jay R. Smith Mfg. Co. Quarterhorse 1/4 Turn Non Freeze Wall Hydrant brochure, 1990, 4 pages.

McMaster Carr Co. 1989 cata. advertisement for Remote Mechanical Valve Actuator, 1989, 1 page.

Apollo® advertisement for ball valve with center drain, page 29.

Introduction to Fluid Mechanics, Fox & McDonald, publ. 1973, Laminar and Turbulent Flows, pp. 43–44, 312–323.

Beckwith, Thomas Marangoni, Roy, Lienhard V, John, Mechanical Measurements, (Addison–Wesley Publ. Co. 5th ed. 1993), p. 617.

Munson, Bruce, Young, Donald, Okiishi, Theodore, Fundamentals of Fluid Mechanics, (John Wiley & Sons 2d. ed. 1994), pp. 492–501, 555–559.

* cited by examiner

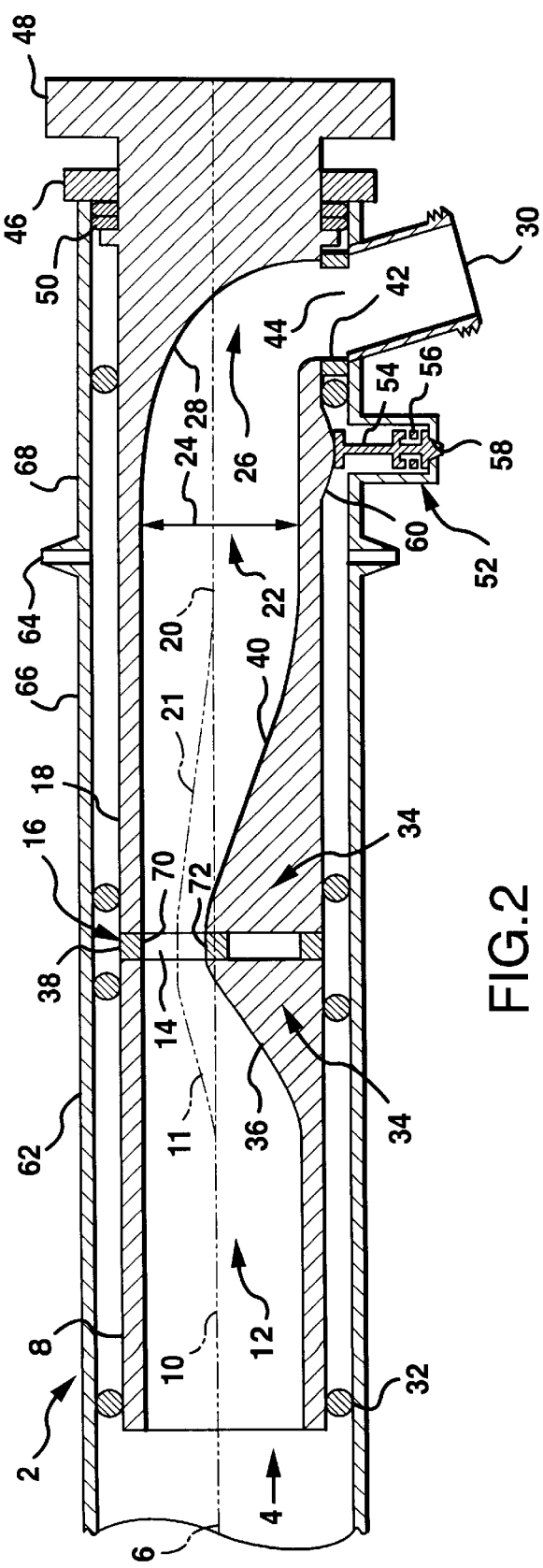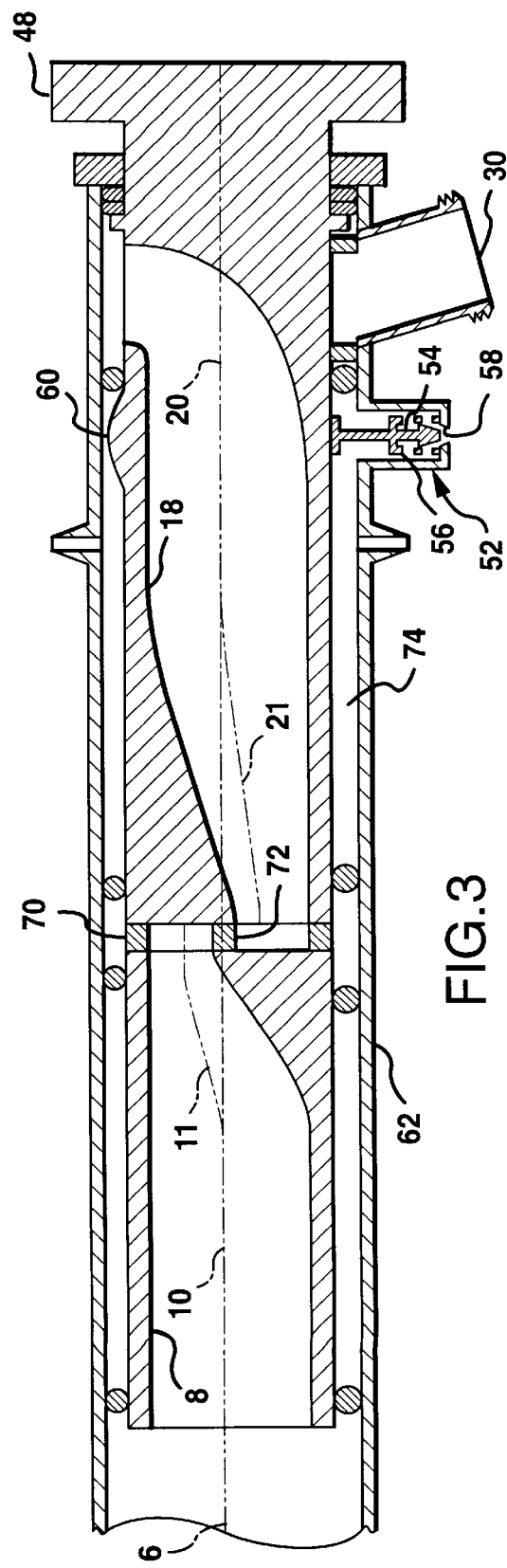

INCREASED FLOW, SPLIT VENTURI VALVE SYSTEM

This is a divisional application of application Ser. No. 08/925,535, filed Sep. 8, 1997, now issued as U.S. Pat. No. 6,109,293, which is a continuation-in-part application of Ser. No. 08/637,203, filed Apr. 24, 1996, now issued as U.S. Pat. No. 5,718,257, each hereby incorporated by reference.

I. FIELD OF INVENTION

The present invention relates to an improved flow rate valve system and valve, especially for axially-rotated valves and includes both apparatus and methods. In particular, the present invention has applicability where a freeze resistant valve is preferred.

II. BACKGROUND OF THE INVENTION

Valves have been used for many centuries in a variety of applications. As the technology has progressed, more sophisticated uses have been found for valves. For instance, various improvements have been made in methods of actuation of the valve. Some of these methods include motor driven actuation, solenoid actuation and more recently, computer controlled actuation, and so forth However, the essential flow design of valves has stayed relatively constant along four basic designs.

One type of valve used is a gate valve. It is simple in design, inexpensive, and can be used in a variety of applications. A gate valve typically contains a circular disk, known as a gate, mounted transverse to a conduit or pipe which engages a seat to block or restrict flow. A gate valve is generally known to those in the art as being poor for controlling flow other than in a fully-opened or fully-closed position. The interface between the gate and its seat generally erodes and is prone to maintenance.

Another typical valve is known as a globe valve. Those in the art know that it is good for throttling at other than fully-opened or fully-closed positions. An example is shown in U.S. Pat. No. 4,066,090 to Nakajima et al. As can be seen, the flow path is somewhat circuitous resulting in generally higher friction losses, nonlaminar flow, and may prematurely induce flow separation and/or cavitation. Thus, flow rates tend to be less than those of a fully-opened gate valve, the fluid flow path tends to wear, and the globe valve, because of its inherent construction, tends to be bulky.

A third type is a ball valve. The ball valve may offer some advantages of increased flow over the globe valve. The valve actuator connected to the ball is mounted transverse to the flow. As the valve opens, the ball is rotated and aligns a central hole in the ball to the conduit through the valve. The ball valve tends to be somewhat bulky, generally uses two seating surfaces on either side of the ball, and may be somewhat expensive to manufacture.

A fourth type of valve is known as a butterfly valve. The butterfly valve has an internal seat that is typically oriented transverse to the conduit. An external valve stem rotates typically a circular disk transverse the conduit to engage the seat to block fluid flow. A butterfly valve generally has high flow rates and low maintenance. However, it retains the typical construction of a transverse-mounted valve with a transverse valve stem. While the valve stem may be remotely actuated by motors and other devices known to those in the art, it may not be suitable for sealed installations where it might be desirable to completely encase the valve, remote actuator, and seat in a conduit for efficient installation nor is it suitable for installing in a wall structure where access to the actuator is restricted because of the transverse orientation.

An underlying quest in the various designs of valves is a balance between low friction losses, high flow rates, and throttling characteristics. Other considerations may include freeze resistance, simplicity of construction, cost of manufacturing, and perhaps other specialized uses. While there have been numerous variations of the valve types such as described above, there remains a need to provide an improved flow, low friction valve. This may be especially useful in applications where a remote actuation along a central axis is desired. Typically, these installations involve freeze resistant installations.

In addressing freeze prevention or reduction, efforts have been concentrated on a remote location of a plug of a globe valve away from ambient conditions that could lead to freezing. A typical example is seen in FIG. 7 of U.S. Pat. No. 4,532,954. By remotely locating the plug, the flow of the liquid, typically water, could be stopped a distance in a pipe or a conduit away from the freezing ambient conditions. Those in the art typically concentrated on a globe valve type seat because of the inherent difficulty of actuating a gate valve from within the conduit. In this construction, the nose portion engages a valve seat to seal any flow at a remote location from adverse ambient conditions. As is shown in that figure, the nose must engage a valve seat through the aperture that restricts the flow of water. This remote location results in a beneficial blocking of the water away from the freezing ambient conditions. However, it causes other problems. The wear surfaces may be prone to water erosion and deposits from water impurities. Also, in order to obtain a proper seal, the mechanical advantage of the screw of the valve stem may, after much use, crush the tip of the nose portion. Once the nose was crushed or deformed, it required even harder tightening of the nose which eventually lead to leading (the famous "drip drip"). Also, the inherent design of the nose portion, engaging an aperture, causes a significant pressure drop, as those with ordinary skill in the art would immediately recognize. This significant pressure drop reduces flow rates. Reduced flow rates may cause a necessarily proportional increase in the size of conduit, valve, or other devices to obtain the needed flow rates. Additionally, the use of the nose section was a modification of the globe valve type seat which required many turns to suitably seal the flow. Likewise, the valve control rod (stem) moved in the typical longitudinal direction—it was not fixed with respect to the conduit or pipe in which it was assembled. Therefore, increased wear and increased maintenance resulted from not only the rotational movement, but the longitudinal movement as it engaged those portions of the valve seat. While an increase in size of the typical valve might achieve the necessary flow rates, typically, this was not a viable option because of size, costs, and compatibility with other components of the piping system.

Thus, prior attempts to remotely seal the water flow or other liquids lead to high pressure drops, low flow rates, and maintenance. The flow rate is especially important in designing sprinkling systems. Both residential and commercial sprinkler systems require a higher flow rate than the typical gate valve or globe valve delivers for given typical size. Thus, an installation was not able to use the typical valving of a typical free resistant hydrant—instead, it required a direct connection to other piping with sophisticated valving controls. The sophisticated valving, as those with knowledge of sprinkler systems would recognize, required expensive controls, maintenance, purging during off season uses, local and national codes, and other issues.

A further complication resulted from the axially rotated valves such as the valves referenced above and others such as U.S. Pat. No. 3,848,806 to Samuelsen, et al. This actuation shows that the valve stem on such axially-rotated valves has been heretofore in the flow path. Until the present invention, on such axially-rotated valves, it may have been considered by those in the art that the valve stem was required to be placed in the flow path in order to engage remotely the nose portion to the aperture. However, the additional turbulence and volume contained by the valve stem in the flow path results in additional loss of efficiency, increased resistance and friction, and lower flow rates.

Thus, as systems have become more sophisticated, a need exists for a valve that can be remotely actuated through the internal structure of a valve away from adverse ambient conditions, and yet be inexpensive, easily installed, of the same or similar diameter to existing piping systems, and still maintain high flow rates and low pressure drops. If a system was available that would allow a high flow rate water hydrant that could be converted to a combination system and water hydrant, it would have an advantage in the market. It would be advantageous to the dwelling owner in a reduction of cost and it would be advantageous to the builder or installer to simply meet the building requirements of installing outside faucets and yet allow conversion to sprinkler systems at minimal costs.

A significant improvement over the typical valves was attained in the U.S. application Ser. No. 08/637,203, now issued as U.S. Pat. No. 5,718,257 to Robert K Burgess and upon which this patent claims a priority date. In that patent, it was realized that a fixed longitudinal position with axial rotation could establish high flows and less pressure drop and friction loss and perhaps less maintenance and less costly installations because of its compactness. In that patent, the invention provided a specially designed valve that had a rotatable sealing element longitudinally fixed in position in a conduit which engaged a seating element likewise longitudinally fixed in position in the conduit. The position could be located a sufficient length or distance from for instance, adverse ambient conditions to enable a sealing of flow away from the adverse conditions. That valve significantly improved the flow rates compared to the state of the art known at that time. Test results suggest that the globe valve might have up to approximately 2 times the pressure loss for a given flow rate than the Burgess invention. Similarly, the Burgess invention appears to have about five times less friction loss than the design shown in the '954 reference above. This invention also allowed a quarter turn from a fully-opened to a fully-closed position. Because of its increased flow, it was felt that it would provide a valve of suitable flow rates that could be installed in the same size as a typical conduit and yet meet even the more demanding sprinkler systems requirements. Among other things, however, that valve retained the typical valve stem located in the flow path.

As an example of the significant improvement in pressure drop by the present invention, FIG. 1a shows the pressure drop as a function of flow rate for various commercially available axially-rotated freeze resistant valves. FIG. 1b shows a graph of measured loss coefficients as a function of Reynolds number for the present invention compared to some commercially available axially-rotated valves and other types of valves, again to show some of the significant improvements of the present invention. The two top curves show valves by competitors, such as are designed for higher flow rates on sprinkler feed systems. Although the '203 valve appeared to have significant improvement over technology existing at the time, the present invention shows an even greater flow rate for a given pressure drop or conversely a lower pressure drop at a given flow rate. The present invention may have a 4 times improvement over some of the competition when based on pressure drops at a given flow rate.

Another reference, U.S. Pat. No. 286,508 to Vadersen, et al, shows an early attempt in providing an axially-rotated freeze resistant valve. For some reason, the embodiment apparently was not received commercially. Perhaps, two reasons exist. First, the valve plate (G) with apertures (H), when aligned with valve (K) in apertures (T), as those with ordinary skill in the art would readily recognize, would create nonlaminar flow, increased friction loss, flow separation, and perhaps cavitation (depending on the vapor pressure of the fluid at that temperature). Secondly, the valve stem appears located in the flow path. This is in direct contrast to the present invention which in some embodiments uses an axially-rotated split venturi to avoid the problems of the Vadersen reference. Thus, it may be that from the Vadersen reference to the present invention of 114 years, little improvements along this particular line appear to have been thought appropriate.

The present invention goes beyond the inventions of the earlier valves and even the U.S. application Ser. No. 08/637,203, now U.S. Pat. No. 5,718,257. The present invention improves the flow rates for a given supply pressure several times over the '203 invention. It has a loss coefficient lower than any known axially rotated valve. Its loss coefficient has been tested and may be approximately 50% of a typical axially rotated valve. It may be even simpler to construct, typically avoids the valve stem in the flow path, offers good throttling characteristics, and yet retains higher flow rates for given pressure drops.

Thus, there has been a long felt, but unsatisfied need for the invention that would meet and solve the problems discussed above. The present invention represents the next step in the quest for low friction, high flow and good throttling characteristics, especially in applications where remote actuation of axially-rotated valves is desired. While implementing elements have all been available, the direction of the inventions of other persons have been away from the present invention. The efforts have primarily concentrated on longitudinally moving backward or forward a nose or other sealing element against a valve seat, typically including an aperture. This has resulted in the above-discussed problems, such as poor flow rates. Those in the art appreciated that a problem existed and attempted to solve the problem with technology as shown in U.S. Pat. No. 4,532, 954. Even with the improvements of the invention of U.S. Ser. No. '203, the problem still existed at less than optimal flow rates for given pressure drops. Alternatively, those in the art simply accepted the extra expense of extra installations, complicated valving, and other requirements necessary for such applications as sprinkler systems. This general mind set taught away from the technical direction that the present invention addresses. It might be unexpected that a valve can have significantly higher flow rates and yet remotely control or block the fluid flow with the same or similar size conduit or pipe found in a typical installation and still offer an economical solution. Until the present invention, it appears that those skilled in the art had not contemplated the solution offered by the present invention.

III. SUMMARY OF THE INVENTION

A primary goal of the present invention is to provide a design which permits increased flow rates for axially-rotated valves, especially those used in freeze resistant prevention valves and sprinkler systems. By recognizing and utilizing the advantages of a wholly different layout and design of a valve, this valve achieves its goals.

The present invention provides an axially-rotated valve which permits increased flow rates and lower pressure drop by using an axial eccentric split venturi with two portions where at least one portion is rotatable with respect to the other portion (As would be known to those with ordinary skill in the art, a typical venturi is a conical contraction then expansion of a conduit through which a fluid flows. Venturies typically are high efficiency devices primarily used for measuring the flow rates of fluids, see e.g., Beckwith, Thomas, Marangoni, Roy, Lienhard V, John, *Mechanical Measurements* p. 617 (Addison-Wesley PubL Co. 5th ed. 1993)). The axially-rotated valve typically may be designed to avoid flow separation and/or cavitation at full flow under a variety of conditions. The valve may be designed, in some embodiments, to delay a transition from laminar flow in at least some portion of the split venturi. A typical cross section of the eccentric split venturi may be nonaxisymmetric such as a semicircular cross section which may assist in both throttling capabilities and in maximum flow capacity using the design of the present invention. Such a design can include applications for freeze resistant axially-rotated valves and may be fully-opened and fully-closed in one-half of a complete rotation. An internal elbow typically connected to a rotatable portion of the eccentric venturi may assist in directing flow with lower friction losses and pressure drop. A valve actuator may actuate in an axial manner yet be uniquely located outside of the axial flow path to further reduce friction losses. A seal may be used between the two portions that may include a peripheral and diametrical seal in the same plane.

Typically, the present invention may be envisioned as useful on residential and commercial installations where it would be desirable to economically reduce the possibility of freezing of the valve. Such applications could also involve sprinkler systems, both underground and above ground. Rather than supplying a system which affords only an incremental increase in performance and design over prior art, the present invention utilizes a technique to achieve significant performance improvement compared to past efforts. The valve of the present invention satisfies one of the criteria by being inexpensive to manufacture and yet offers high flow rates, good maintenance, low pressure drop, and throttling capabilities.

This invention has a significant advantage in the sizing of valves and pipes. It retains the desirability of quickly opening and closing from a fully-opened to a fully-closed position. At a full flow, in some embodiments, the present invention seeks to sustain a streamlined, noncavitating flow, and in some embodiments, a somewhat laminar flow. This may result in less turbulence and reduced friction loss. This invention is particularly important in resolving the difficulties with axially-rotated valves mounted in the flow stream and actuated along a longitudinal axis parallel to a central axis of the valve in a flow direction.

Another goal of the present invention is to provide a design for an axially-rotated valve which permits increased flow rates and less pressure drop using an axial eccentric split venturi with two portions where at least one portion is rotatable with respect to the other portion. An objective of this goal is to provide an axial rotator to rotate at least one of the portions without a substantial engagement of the axial rotator within the flow path. Another goal is to provide an eccentric split venturi approximating the shape of a semicircular cross section in a direction transverse to the flow path which may assist in both throttling capabilities and in maximum flow capacity with the design of the present invention. Such a design can include the object of providing a freeze resistant axially-rotated valve. It may be provided with a length of at least six inside diameters (preferably seven or eight) of the portion, particularly the downstream portion, to assist in providing smooth transitional flow through the split venturi. Another objective may be to provide a cartridge assembly comprising at least part of the valve so that it may be easily retracted and inserted into a conduit of the valve. Such a design may be fully-opened and fully-closed in one-half complete rotation. While this may not be as rapidly opening as the embodiment shown in the '203 invention, it is believed that such a rapid rotation will satisfy the goals and objectives of the marketplace. Also, the invention may include a purge port adapted to open and allow drainage of the valve when the valve is in at least a partially closed position and typically in a fully-closed position. By using one type of split venturi, the flow rate on the inlet side of the split venturi would include gradually reducing the pressure of the flow as it flows into the first portion of the split venturi and at the same time increasing the velocity of the flow. At the split or interface of the split venturi between the first portion and a second portion, the flow would start to gradually increase in pressure while decreasing in velocity as it flows through the second portion of the split venturi to some exit port. In some instances, the ambient conditions may be such that the conduit itself may provide a conduction path to adverse ambient conditions, such as freezing temperatures. In such instances, it may be beneficial to split the conduit in the freezing area and create a thermal barrier between at least the two portions of the conduit such that the energy is not lost to adverse ambient temperatures. At the interface behind the first portion and second portion, a seal may be used. Such a seal could be adapted to seal the periphery of the interface and in some instances seal diametrically, as will be discussed further. The diametrical seal may be linear or, in some fashion, curvilinear. In some embodiments, the conduit might not be rigid, at least in parts. The conduit might include for instance a flexible tube. A proper location might be such that no interference of the seal between the first and second portions might occur.

Another goal of the present invention is to provide a valve that includes a split venturi between the first and second portion where the portions are non-axisymmetric relative to a central axis. Heretofore, the typical venturi design has been concentric in that at any given cross section the outer periphery is equidistant from a central axis. The present invention abruptly departs from this standard practice by having a non-axisymmetric or eccentric venturi that is split in two sections The two sections may be fluidly connected to one another such as the fluid might flow from one into the other with little change across the interface. Furthermore, such a flow path may be semicircular. By departing from this standard practice of axisymmetric venturis, the present invention is better able to utilize its unique closing and opening capabilities. It is another objective of the present invention to include a rotating internal elbow connected to at least one of the portions that rotates so that as the portion is rotated, the internal elbow can direct the flow into a valve outlet.

Another goal of the present invention is to include an axially-rotated valve using a split venturi having a first and second portion where at least one portion may be rotated by an axial rotator outside of the flow without substantial interference with flow efficiency. One objective of this goal is to provide an axially-rotated valve that is designed to provide streamlined flow (that is, avoiding flow separation and/or cavitation at full flow under a variety of conditions).

Naturally, other objectives of the invention are disclosed throughout other areas of the specification and claims. In addition, the goals and objectives may apply either in dependent or independent fashion to a variety of other goals and objectives in a variety of embodiments.

IV. BRIEF DESCRIPTION OF THE DRAWINGS

FIG. 2 is a cross section of the present invention from a side perspective in a fully-opened orientation.

FIG. 3 is a cross section of the present invention from a side perspective in a fully-closed orientation.

V. DETAILED DESCRIPTION OF THE PREFERRED EMBODIMENT

Figure 1A:
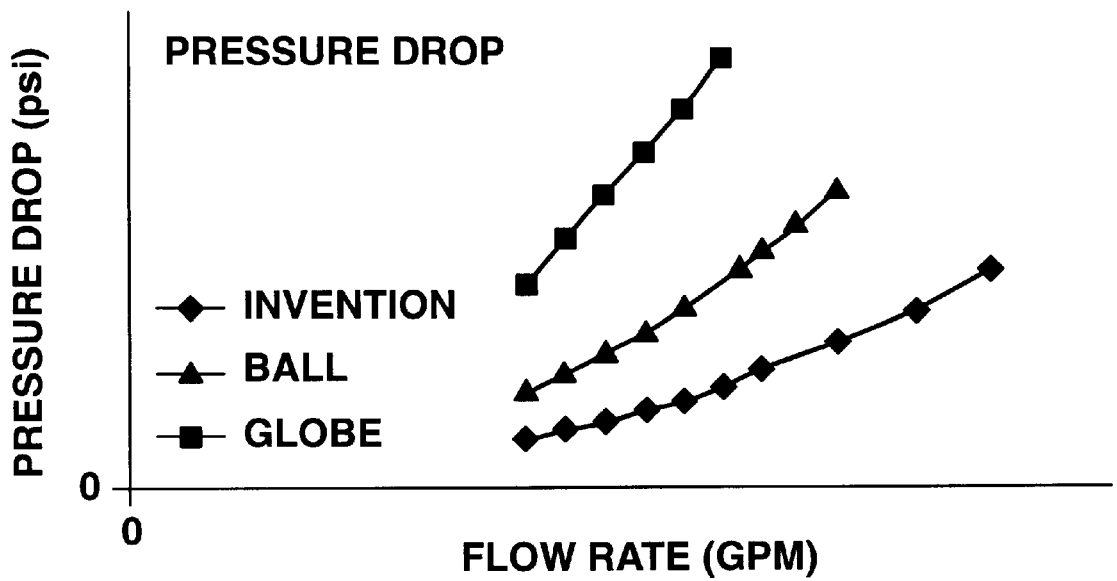
FIG. 1a shows a graph of pressure drop as a function of flow rate test results of the present invention compared to some commercially available axially-rotated valves to show some of the significant improvements.
Figure 1B:
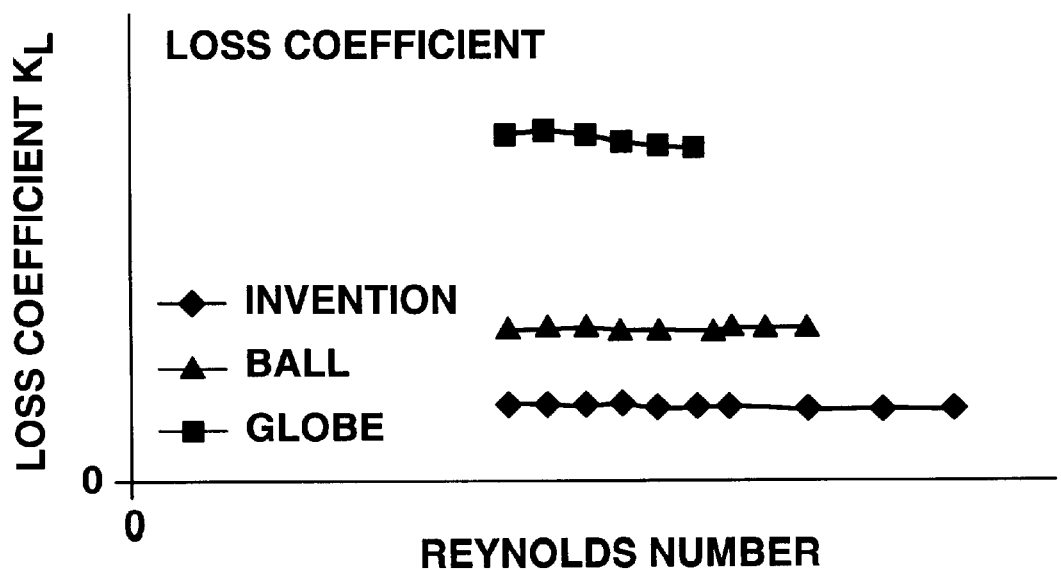
FIG 1b shows a graph of measured loss coefficients as a function of Reynolds number for the present invention compared to some commercially available axially-rotated valves and other types of valves, again to show some of the significant improvements of the present invention

As mentioned earlier, the present invention includes a variety of components that may be used in various combinations, depending on the application that needs to be addressed. This invention is intended to encompass a wide variety of embodiments of an axially-rotated valve. In particular, the invention is designed primary to take advantage of low friction loss, high efficiency, high flow through an eccentric split venturi of a particular and novel design and combine and modify as needed for a variety of shapes, sizes and orientations, as will be explained in more detail as the figures are described. Elements, functions and procedures that distinguish the present invention will be noted where appropriate.

As can be easily understood, the basic concepts of the present invention may be embodied in a variety of ways. It involves both methods and devices to accomplish the appropriate method. In this patent, the methods are disclosed as part of the results shown to be achieved by the various devices described and as steps that are inherent to utilization. They are simply the natural result of utilizing the devices as intended and described. In addition, while some devices are disclosed, it would be understood that these not only accomplish certain methods, but also can be varied in many ways. Importantly, as to the foregoing, all these facets should be understood to be encompassed by this disclosure.

FIG. 2 shows a fully-opened eccentric split venturi axially-rotated valve in a cross-section side view. Starting from the left of the valve (2), a flow (4) enters the valve. The valve may have a central axis (6) which for a typical valve may operate as a center line of the valve. As the flow (4) enters the valve (2), the flow may first encounter a first portion (8) having a first longitudinal axis (10) and a first flow path (12). The flow (4) may progress across an interface (14) along a first flow axis (11) in a transition flow zone (16) and into a second portion (18). The second portion (18) may have its own second flow axis (21), a second longitudinal axis (20), a second flow path (22), and a diameter (24). As the flow continues, it may exit through an exit port (26). The exit port in some embodiments may include an internal elbow (28) to help direct the flow (4) into a valve outlet (30).

The first portion (8) may be a fixed sleeve inside the valve (2). By fixed, it is intended to mean that generally the first portion remains in a constant rotational orientation with respect to the valve in use. The first portion (8) may be removable from the valve or may be more securely attached, such as being made integral to the valve, welding, brazing, adhesively attaching, compression fitting, and so forth as would be known to those skilled in the art. One possibility for the first portion (8) is that it may be a cartridge assembly which may be removable for maintenance or replacement purposes. As a cartridge assembly, it may include cartridge seals (32) in a variety of places as would be appropriate and known to those skilled in the art.

The first portion (8) may include an eccentric portion of a split venturi. A typical venturi includes a smooth transition from a large diameter to a small diameter and then again to a large diameter. The present valve uniquely uses a venturi that is split into at least two portions. At the split, the interface (14) results in a transition flow zone (16) from a decreasing cross sectional area to an increasing cross sectional area. The first portion (8), working in conjunction with the second portion (18), to be described in more detail below, typically would have an eccentric split venturi so that by rotating the second portion, a closure of the flow (4) may be had.

As the flow (4) continues along the first portion (8) and engages the split venturi (34), it encounters an inlet slope (36). The inlet slope (36) may form a conical shape of uniform slope about the periphery of the flow path with respect to the longitudinal axis in some embodiments. However, in the preferred embodiment, the slope may form an eccentric slope. By eccentric, it is meant to relate to a slope along a longitudinal perspective and may include such slopes as are shown in FIG. 2 where the flow-path may have different slopes about the periphery of the flow path. This would include diverging the center of the flow (4) from the longitudinal axis (10) to the first flow axis (11). Similarly, an eccentric slope could diverge the flow path through second portion (18) along a central second flow axis (21) then to second longitudinal axis (20). The first flow axis (11) and second flow axis (21) are central axes of the flow paths through the first portion (8) and second portion (18) and may vary in relative height with respect to the central axis (6) as the flow turns up the first slope (36) and into the split venturi (34) and then down slope (40). (The first longitudinal axis (10) and the second longitudinal axis (20) in the preferred embodiment may coincide with the central axis (6) through the valve.) As the flow continues toward the transition flow zone (16), the slope may decrease. In the preferred embodiment, the slope may be a zero slope, that is, neither decreasing nor increasing in cross sectional area at the interface (14) in the transition flow zone (16). In the preferred embodiment, the slope on the first portion (8) appears to be less critical than the slope on the second portion (18). Thus, the slopes may be different. The slope on the first portion may be approximately 5–15 degrees, although other angles could be suitable, and for some embodiments a slope of 9–11 degrees may be appropriate.

Figure 5:
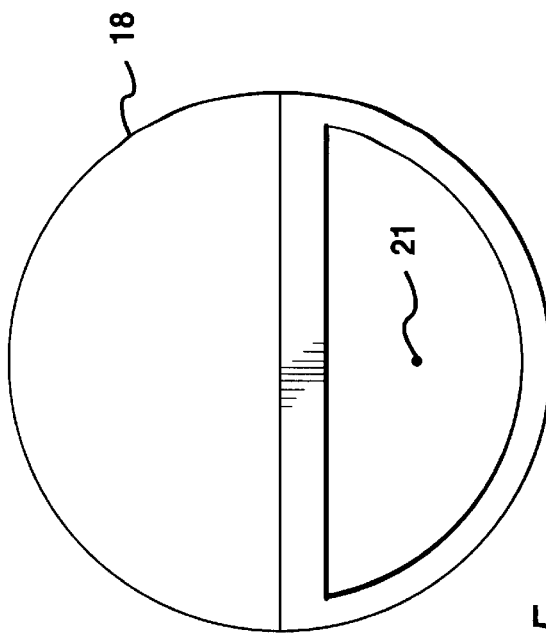
FIG. 5 shows an end view of the second portion (18) in a non-axisymmetric eccentric embodiment shown in FIG. 3.
Figure 7:
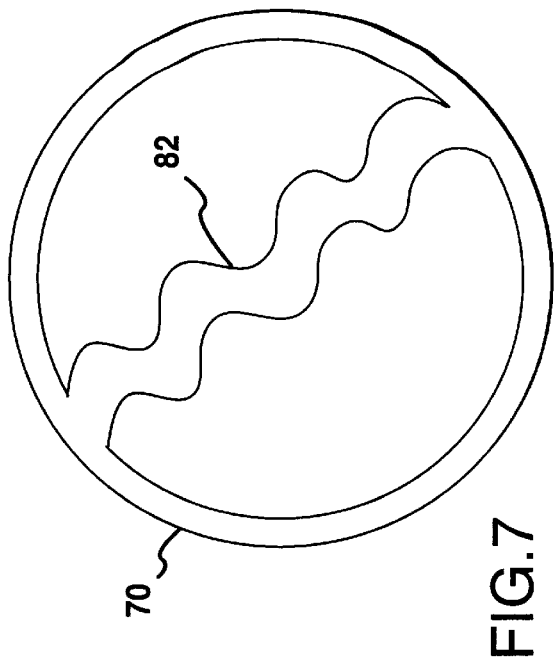
FIG. 7 is an end view of a seal at an interface between a first and second portion as an alternative embodiment to FIG. 6.
Figure 4:
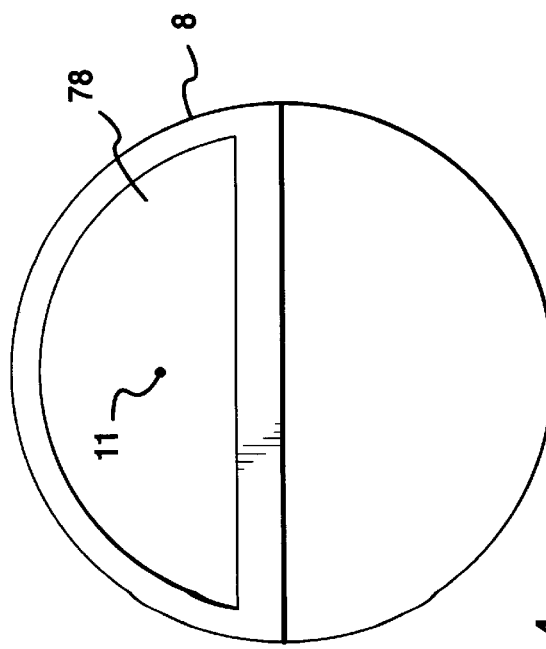
FIG. 4 shows an end view of the first portion (8) in a non-axisymmetric eccentric embodiment shown in FIG. 3.
Figure 6:
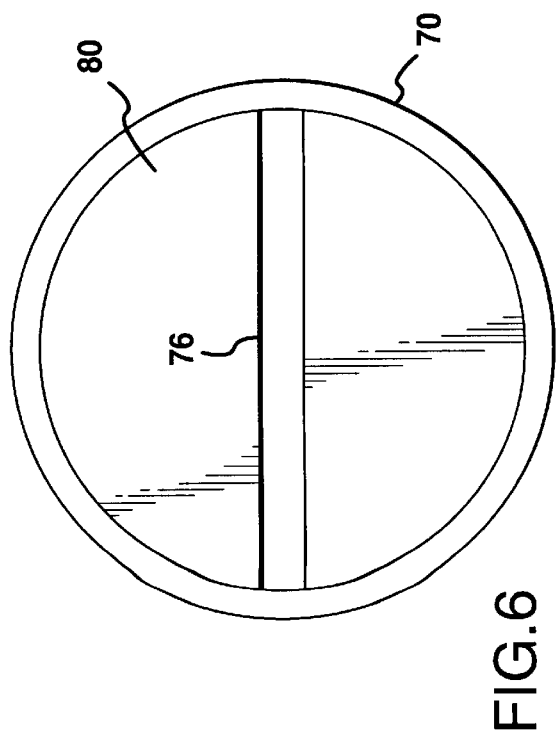
FIG. 6 is an end view of a seal at an interface between a first and second portion.

In addition to the eccentricity of the split venturi, the cross sectional area across the flow path shown more accurately in FIG. 3 may be non-axisymmetric, such as approximately semicircular. By semicircular, it is not meant to be restricted to an exact 180° of a perfect circle; it can have a variety of shapes that could include approximately one-half of a flow area of the flow path of the flow (4) less any requirements for a diametrical seal such is shown in FIGS. 6 and 7. The non-axisymmetric aspect of FIG. 4 relates to the cross sectional flow area. For instance, the first flow axis (11) is shown at a center of the cross sectional area, where the center represents a midpoint of the distances to the periphery. In other words, the points of the periphery of the flow area are not equidistant from the first flow axis (11). Similarly, in FIG. 5, the second portion (18) may have a correspondingly shaped cross sectional flow area about a second flow axis (21) to align with the cross sectional area and flow path with the first portion (8).

Returning to FIG. 2, as the flow flows across the interface (14) in the transition flow zone (16), the flow enters the second portion (18). As would be known to those skilled in the art, in the transition flow zone, the pressure exerted by the flow may be minimal due to the characteristics of the split venturi However in a closed position (shown in more detail in FIG. 3), the static pressure of the substance such as a fluid may exert pressure at the interface (14) between the first portion (8) and the second portion (18). If desired, a first seal (38) may be provided in the interface (14).

As a flow flows through the second portion (18), the flow is gradually increased in pressure and decreased in velocity. Test results show that for optimal flow characteristics, and in order to obtain less friction loss and higher flow rates, the slope (40) of the second portion (18) may be more important than the first slope (36). The slope (40) may be inclined at an angle of approximately 5–15 degrees, and in the preferred embodiment, approximately 7–8 degrees. The length to diameter ratio maybe at least 6:1, and preferably at least 8:1. In other words, the length of the second portion (18) in the preferred embodiment may be at least six times longer than the diameter (24) of the second portion (18) for optimal flow characteristics in reducing pressure drop and increasing flow rate for a given pressure and diameter. It has been observed that such a slope may avoid, under many conditions, the flow separation and/or cavitation of the fluid as it flows from the first portion into the second portion and through the second portion. Cavitation and flow separation will be discussed in more detail below.

At some point along the second portion (18), the flow (4) may exit through an exit port (26). To assist in reducing the pressure drop from the flow, a smooth transition may be preferable. A smooth transition in exit port (26) may include an internal elbow (28). The internal elbow may be fluidicly connected or may be integral to the second portion (18). In some embodiments, the integral elbow may be fluidicly connected to the first portion (8). As the flow exits through the exit port and perhaps through the internal elbow (28), the flow may be directed through a valve outlet (30). In some embodiments, it may be useful to have an exit port seal (42) located at the exit port interface (44) between the exit port (26) and valve outlet (30). This exit port seal (42) might further enhance any sealing capabilities such as might be needed for a particular application. The valve outlet (30) could include typical hose connections, hose bibs, and so forth as would be commonly known to those in the industry. To further assist the flow out of the exit port region and through the valve outlet, the internal elbow may be configured (such as be casting, molding, machining, and so forth) to a more circular shape (from the preferred embodiments semicircular cross section) so that the flow may proceed into the typically circular valve outlet shape such as a hose bibb, known to those in the art.

In the preferred embodiment, a valve actuator (48) may act in an axial direction to rotate the second portion (18) where the second portion (18) could be described as a rotatable sleeve. As discussed earlier, one of the pressure losses (up to approximately 20% of the pressure loss) of axially-rotated valves has included the presence of a valve stem within the flow path. As can be seen in FIG. 2, the valve actuator (48), operating in an axial fashion, is outside the flow path. The valve actuator in FIG. 2 may be directly connected and may be integral to the rotatable sleeve functioning as a second portion (18). Thus, the valve actuator (48) may cause no or little pressure loss compared to a valve actuator located within the flow path of the flow (4) of typical axially rotated valves such as disclosed in U.S. Pat. No. 4,532,954. To operate the valve, the valve actuator might only be turned approximately one-half turn from a fully-opened to a fully-closed position. As would be known to those skilled in the art, a packing or other sealing member (46) could be used to seal the valve from internal leakage along the area of the valve actuator (48).

Similar to the first portion (8) being included as a cartridge, the second portion (18) may similarly be included as a cartridge. This could be especially suitable if the first portion (8) were fixed in position in a more permanent mode. Thus if replacement and maintenance were desired, the cartridge assembly could include the valve actuator, internal elbow, exit port and other parts of the second portion (18) and perhaps even the first seal (38) so that quick and easy maintenance could be accomplished.

To aid in the sealing of the second portion (18) with the first portion (8), an axial compression member (50) may be included. For instance, in the preferred embodiment, the axial compression member (50) may be a spring or a Bellville washer, as would be known to those with skill in the art, or other biasing elements.

A further aspect of the present invention may include the provision of a purge valve (52). The purge valve (52) may include a purge plug (54), a purge biasing member (56), and a purge seat (58). A purge valve actuator (60), for instance, located on a second portion (18), when rotated to an appropriate position, could push the purge plug (54) against the purge seat (58) and seal the purge port when a flow condition existed. When a purge valve actuator was rotated to an offset position, the purge biasing member (56) could bias the purge plug (54) off the purge seat (58) and allow drainage of any appropriate spaces.

In some instances in adverse ambient conditions, such as freezing weather, it may be preferable to provide a thermal break in the conduit. The conduit (62) may be an external portion of the valve body. Typically, this may include some metallic substance such as brass, steel, copper, bronze, and so forth as would be known to those skilled in the art. Because metal typically is a conductor, as opposed to an insulator, the exposure of the conduit surfaces to adverse ambient conditions may encourage freezing at the valve. In such instances, it may be preferable to provide a thermal break (64) and divide the conduit into at least a first conduit section (66) and a second conduit section (68). The thermal break may include a variety of substances such as nonconductive plastic, insulation, or any other elements such as would retard the adverse ambient condition from being transmitted down the conduit. One of the aspects of the present valve is that it may allow the location of the thermal break in a variety of locations.

FIG. 3 shows the valve in a fully-closed position. The first portion (8) has remained in position; however, the second portion (18) has been rotated, in this instance, approximately 180° about its longitudinal axis. In the preferred embodiment, the longitudinal axis overlaps the central axis (6). However, it is possible that other embodiments could vary the alignment. It is envisioned that in most instances, the longitudinal axis will at least be substantially parallel to the central axis (6). By parallel, it is meant to include unless otherwise stated substantially parallel up to an approximately 30° deviation.

As can be shown in FIG. 3, the internal elbow may be rotated into a nonaligned position with respect to the valve outlet (30). As described in FIG. 2, there may be a seal between the internal elbow (28) at the exit port interface (44) and the valve outlet (30). Thus, it might even be, in some embodiments, that the first seal (38) might not be present. Also, as shown in FIG. 3, the valve actuator (48) has simply been rotated approximately 180° or a one-half turn rotation to effect the restriction of the flow (4). Such a quick shut off or restriction may be useful in many instances. Also shown in FIG. 3 is the purge valve actuator (60) in a rotated position away from the purge valve (52) where the purge plug (54) has been biased away from the purge seat (58).

As mentioned earlier, FIG. 2 and FIG. 3 show a first seal (38). FIGS. 3, 6, and 7 show the peripheral seal (70) and the diametrical seal (72) (as a linear diametrical seal (76) and a curvilinear diametrical seal (82)). As the second portion (18) and first portion (8) are biased toward each other, the first seal (38) acting through the peripheral seal (70) and the diametrical seal (72) may restrict leakage of the flow (4) from the first portion (8) into the second portion (18). It may also restrict leakage into the cavity (74) between the conduit (62) and the first and second portions.

This term seal is intended as a functional term. Thus, a separate member may not be necessary. For instance, some test results show that some materials may inherently seal without the necessity of a separate seal. For instance, Delrin™ is generally considered a hard plastic, and yet appears to be soft enough (with a durometer of approximately 80) such that a seal may be effected functionally. Such a seal may be enhanced by the axial compression member (50) pressing the first portion (8) and second portion (18) toward each other. Another advantage of Delrin™ appears to be that it is a self lubricating plastic. In other words, it may resist scoring as it is rotated back and forth. Other materials that may offer possibilities are other polymers, ceramics, various metals, and so forth. The appropriate material may be varied depending upon the particular application. For instance, it is known that softer materials resist erosion of abrasive materials better than harder materials. Thus, those with a lower durometer, may be more suitable in some instances, as would be known to those with skill in the art Furthermore, while the conduit (62) has been described generally in a metallic fashion, it is entirely feasible to have a conduit of other materials such as plastics and so forth. In some instances, the conduit could even be made of a soft flexible material, at least in a portion.

Also, as would be known to those with skill in the art, an in-line spool perhaps with two seals between the first portion (8) and the second portion (18) could be useful in some embodiments. Naturally, other embodiments could be used. In some instances, it may not even be important to have a seal between the first and second portion. The market place and commercial concerns might dictate the particular variations.

The valve rotator (48) has been shown to be connected to the second portion (8). Naturally, other embodiments are possible. For instance, because the flow between the first and second portions may be sealed from the cavity (74), it is possible that side mounted valve actuators that might extend through the conduit (62) could rotate for instance the second portion (18). Such a valve rotator could still be considered an axial rotator because it could indeed rotate for instance the second portion (18) along the second longitudinal axis (20) and even be outside the flow path of the flow (4).

FIG. 6 shows an end view of the first seal (38). As described above, the first seal (38) could functionally be incorporated into the particular material used as the first portion (8) or the second portion (18) or both. The first seal (38) might include a peripheral seal (70). The peripheral seal as shown in FIGS. 2 and 3 might seal the outer perimeter of the first and second portions. The first seal (38) might also include a diametrical seal (72), shown in FIG. 6 more particularly as a somewhat straight linear diametrical seal (76). As shown in FIG. 2 and FIG. 3, the diametrical seal (72) might be located at the juncture where the first portion and second portion are rotated with respect to each other along the respective longitudinal axis. The thickness and width and resulting cross sectional area of the diametrical seal might be structured to contain the full pressure of the flow (4) when the second portion (18) is rotated to a restricting position, shown in FIG. 3. This typically would relate to the strength of materials, pressure, diameter, and other factors known to those with skill in the art. By diametrical, the term is meant to include a variety of cross sections such as circular, eccentrical, rectangular, square, and other cross sectional areas. In the test results, it appears to the flow area (78) of FIG. 4 might correspond to the open area (80) of the seal in FIG. 6 such that the flow area (78) might not be less than approximately 40% of the flow path in the preferred embodiment compared to the flow area, for instance, at the diameter (24). (The various percentages and members described in this patent are approximate and may be varied according to the particular conditions and flows desired.) The linear diametrical seal (76) as shown in FIG. 6 may be substantially planar to the peripheral seal (70).

FIG. 7 shows an alternative embodiment of the diametrical seal (72). While FIG. 6 shows a somewhat straight linear diametrical seal, the present invention is not so restricted. It may include a variety of seals in a diametrical fashion. Such a seal could include the curvilinear diametrical seal (82) shown in FIG. 7. In most instances, where a high flow was desired, the minimal restriction would be preferred. Thus, the cross sectional area of the diametrical seals would preferably be minimized to effect the higher flow rates.

It is a goal of the present invention to minimize pressure drop through the valve, even at high flow rates. Increased pressure drop may be caused by turbulent flow, flow separation, and/or cavitation. Flow in piping components, including valves, is typically characterized by the loss coefficient, which is proportional to the pressure drop through the component and inversely proportional to the fluid density and inversely proportional to the fluid velocity squared. The flow coefficient may be represented by the formula: $K_L = \Delta P / \frac{1}{2} \rho V^2$ where $K_L$ represents the flow coefficient, $\Delta P$ represents the pressure drop, $\rho$ represents the density of the fluid, and V represents the average velocity of the fluid in the nominal pipe.

By manufacturing and using a slope (40) for the eccentric split venturi such as described above, and even perhaps by using an internal elbow (28), the loss coefficient can be minimized. (Obviously, other steps, in addition to and in lieu of may be taken that could result in a lower loss coefficient.) This may result in a valve with a lower pressure drop even at high flow rates. Test results have shown that the loss coefficient of this particular invention is less than those of any known axially-rotated valve. The loss coefficient for this type of valve may range in the area of 4 or less. (Obviously, this value is intended to cover ranges of approximately 4 and is not intended to apply specifically to 4.000. The same is true for the other values expressed in this application.) For the preferred embodiment, the range may be 3.5 or less. By comparison, the loss coefficient of other types of axially-rotated valves such as that disclosed in the '954 reference described above has been measured to be 15 at comparable flow conditions. The present invention has even a lower loss coefficient than other types of axially actuated valves used in the marketplace. As would be known to those in the art, the loss coefficient may be fairly constant across a range of flows and, thus, the improvements of the present invention may apply broadly.

Another aspect of the invention relates to flow separation. Separation may occur when there is flow over or past an insufficiently streamlined, blunt object. When the flow rate becomes sufficiently large, the streamlines of the flow past such objects no longer follow the boundaries of the flow. Indeed, flow may actually reverse in the separated region, which actually decreases the effective cross-section area of a closed conduit. (See, e.g., Munson, Bruce, Young, Donald, Olkishi, Theodore, *Fundamentals of Fluid Mechanics*, p. 558 (John Wiley & Sons 2d. ed. 1994)). Thus, flow separation leads to higher pressure drop, resulting in an overall higher loss coefficient. This invention has been designed to minimize or eliminate flow separation.

It is also a goal of the preset invention to include non-cavitational flow in some embodiments. The embodiments described, especially in FIGS. 2 and 3, may assist in this goal. Generally, the transition flow zone (16) appears to be the more important area to assist in avoiding cavitation. The cavitation occurs, as would be known to those with skill in the art, when the flow characteristics establish a pressure gradient that exceeds the vapor pressure for a given fluid at a given temperature. By manufacturing and using a transition flow zone for the eccentric split venturi described above, cavitation may be avoided in many instances at full flow at least in this area of the valve. Generally, in the preferred embodiment, this area should be as large as possible in keeping with the goals and objectives of the present invention to lessen the risk of cavitation, where appropriate.

In some embodiments, the flow may also be somewhat laminar. While there may be boundary layer flow that on a microscopic scale might not be laminar, as would be known to those with skill in the art, the laminar flow on a macroscopic scale may be realized to the present invention. Laminar flow is one in which the fluid flows in layers. There may be small macroscopic mixing of adjacent fluid layers. The laminar flow may be seen, for instance, by introducing a dye somewhere in the stream to develop a stream line which flows through a portion of the valve without substantial deterioration. In such instances, the laminar flow may point to the smoothness of the flow with the resulting lower friction loss and higher flow rates for a given size of valve at a given pressure. As would be known to those with skill in the art, the laminar flow characteristics can be related to the Reynolds Number. Thus, by choosing an appropriate curve, which may include the type described for slope (40) above for the eccentric split venturi, the pipe diameter (that is a cross sectional area at any given point in the venturi) and the average flow velocity may be carefully controlled so that an appropriate Reynolds Number may not be exceeded and the flow is somewhat laminar in some portion of the split venturi and may include a substantial percentage of the second portion (18). (The discussion of flow separation, cavitation, and laminar aspects does not necessarily include the flow through the exit port and internal elbow.)

Regarding the throttling characteristics, it may be seen that as the first portion (8) and second portion (18) are rotated using, in the preferred embodiment, the semicircular eccentric split venturi, an unusually small area of the flow path (78) of the first portion may correspond to an unusually small area of the flow path of the second portion as the valve is closed. In other words, a small portion of the diametrical "pie" may be used for small variations in controlling the flow.

Each of these valve embodiments could include various facets of the present invention. Some may include flow separation and/or cavitation flow avoidance elements, while others may not include such elements. Some may include varieties of seals and others not include such seals, while still others may include certain optimal flow lengths while others may be less concerned about the optimal flow length. The market place and manufacturing concerns may dictate the appropriate embodiments for the present invention.

The foregoing decision and the claims that follow describe only the preferred embodiments of the present invention. Particularly with respect to the claims, it should be understood that a number of changes may be made without departing from the essence of the present invention. In this regard, it is intended that such changes, to the extent that they substantially achieve the same results in substantially the same way, will still fall within the scope of the present invention.

Although the methods related to the system are being included in various detail, only initial claims directed toward the valve have been included. Naturally, those claims could have some application to the various other methods and apparatus claimed throughout the patent. The disclosure of the apparatus or method context is sufficient to support the full scope of methods and apparatus claims with, for instance, the axially-rotated valves, purge ports, non-axisymmetric venturis, internal elbows, unseparated, non cavitation, and laminar flow designs, and so forth. While these may be added to explicitly include such details, the existing claims may be construed to encompass each of the other general aspects. Without limitation, the present disclosure should be construed to encompass subclaims, some of those presented in an apparatus or method context as described above for each of the other general aspects. In addition, to the extent any revisions utilize the essence of the invention, each would naturally fall within the breadth of protection encompassed by this patent. This is particularly true for the present invention since its basic concepts and understandings may be broadly applied.

As mentioned earlier, this invention can be embodied in a variety of ways. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "seal" should be understood to encompass disclosure of the act of "sealing"—whether explicitly discussed or not—and, conversely, were there only disclosure of the act of "sealing", such a disclosure should be understood to encompass disclosure of a "seal." Such changes and alternative terms are to be understood to be explicitly included in the description.

It is simply not practical to describe in the claims all the possible embodiments to the present invention which may be accomplished generally in keeping with the goals and objects of the present invention and this disclosure and which may include separately or collectively such aspects as axially-rotated valves, eccentric split venturis, internal elbows, valve actuators located outside the flow path, and other aspects of the present invention. While these may be added to explicitly include such details, the existing claims should be construed to encompass such aspects. To the extent the methods claimed in the present invention are not further discussed, they are natural outgrowths of the system or apparatus claims. Therefore, separate and further discussion of the methods are deemed unnecessary as they otherwise claim steps that are implicit in the use and manufacture of the system or the apparatus claims. Furthermore, the steps are organized in a more logical fashion; however, other sequences can and do occur. Therefore, the method claims should not be construed to include only the order of the sequence and steps presented.

Furthermore, any references mentioned in the application for this patent as well as all references listed in any information disclosure originally filed with the application are hereby incorporated by reference However, to the extent statements might be considered inconsistent with the patenting of this/these invention(s), such statements are expressly not to be considered as made by the applicant(s).

We claim:

1. A method of improving flow from an axially-rotated valve using a split venturi comprising:
    a. flowing through a flow path having a pressure and velocity wherein said flow path has a flow path periphery;
    b. entering a first portion of an eccentric split venturi;
    c. gradually reducing said pressure of said flow while increasing said velocity of said flow through said first portion of said eccentric split venturi;
    d. flowing across an interface of said split venturi between said first portion and a second portion, said second portion contained within a venturi sleeve periphery which does not extend substantially beyond said flow path periphery;
    e. gradually increasing said pressure of said flow while decreasing said velocity of said flow through said second portion of said eccentric split venturi;
    f. exiting said second portion through an exit port fluidicly connected to said second portion;
    g. axially rotating said second portion of said eccentric split venturi to at least a partially closed position;
    h. at least partially restricting said flow from flowing through said axially-rotated valve at said interface;
    i. rotating said second portion of said eccentric split venturi to at least a partially open position;
    j. allowing said flowing through said axially-rotated valve.

2. A method of improving flow from an axially-rotated valve as described in claim 1 wherein said axially rotating said second portion comprises axially rotating said second portion with an axial rotator outside of said flow path without substantial interference with flow efficiency.

3. A method of improving flow from an axially-rotated valve as described in claim 1 wherein flowing across an interface comprises flowing through a semicircular eccentric flow path.

4. A method of improving flow from an axially-rotated valve as described in claim 1 further comprising assisting said sealed interface with an axial pressure element.

5. A method of improving flow from an axially-rotated valve as described in claim 1 wherein gradually increasing said pressure of said flow while decreasing said velocity of said flow comprises avoiding cavitation of said flow.

6. A method of improving flow from an axially-rotated valve as described in claim 1 further comprising establishing a loss coefficient of 4 or less through said axially-rotated valve.

7. A method of improving flow from an axially-rotated valve as described in claim 1 wherein flowing through a flow path comprises flowing through a thermally conductive conduit and further comprising:
    a. providing a separation in said thermally conductive conduit in a freezing zone wherein said separation creates a first conduit section and a second conduit section of said conduit; and
    b. thermally breaking said first conduit section from said second conduit section in a freeze zone.

8. A method of improving flow from an axially-rotated valve as described in claim 1 further comprising sealing at said interface comprising:
    a. sealing about a periphery of said interface between said portions;
    b. sealing across a diametrical portion of said interface in the same plane as said sealing about said periphery.

9. A method of improving flow from an axially-rotated valve as described in claim 1 further comprising resisting the freezing of said axially-rotated valve.

10. A method of improving flow from an axially-rotated valve as described in claim 1 further comprising flowing through a length of said second portion sufficient to substantially eliminate flow separation through said second portion.

11. A method of improving flow from an axially-rotated valve as described in claim 1 further comprising flowing through a longer flow path in said second portion than said first portion.

12. A method of improving flow from an axially-rotated valve as described in claim 1 further comprising exiting said second portion through an exit port comprising exiting through an internal elbow to a valve outlet fluidicly connected to said axially-rotated valve.

13. A method of improving flow from an axially-rotated valve as described in claim 12 further comprising sealing at said exit port between said internal elbow and said valve outlet.

14. A method of improving flow from an axially-rotated valve as described in claim 1 wherein said flowing through said flow path comprises flowing through a conduit and further comprising inserting at least one of said portions as a cartridge assembly in said conduit.

15. A method of improving flow from an axially-rotated valve as described in claim 14 further comprising sealing said cartridge assembly in said conduit.

16. A method of improving flow from an axially-rotated valve as described in claim 1 further comprising sealing said second portion with said first portion with a curvilinear diametrical seal at said interface.

17. A method of improving flow from an axially-rotated valve as described in claim 1 wherein said flowing through said flow path comprises flowing through a conduit and allowing said conduit to flex.

18. A method of improving flow from an axially-rotated valve as described in claim 1 wherein axially rotating from a closed position to an open position comprises axially rotating said second portion approximately one half turn.

19. A method of improving flow from an axially-rotated valve as described in claim 1 further comprising purging said axially-rotated valve in at least a partially closed position.

20. A method of improving flow from an axially-rotated valve using a split venturi as described in claim 1, further comprising the step of elastically opposing said axially-rotated valve to pressure forces in an axial direction of said axially-rotated valve.

21. A method of improving flow from an axially-rotated valve using a split venturi as described in claim 20, wherein said step of elastically opposing said axially-rotated valve to pressure forces in an axial direction of said axially-rotated valve comprises elastically opposing to a change in fluid flow.

22. A method of improving flow from an axially-rotated valve using a split venturi as described in claim 21, wherein said step of elastically opposing to a change in fluid flow occurs after a step of axially rotating said second portion of said eccentric split venturi.

23. A method of improving flow from an axially-rotated valve using a split venturi as described in claim 20 or 21, further comprising the step of adapting at least one of said portions of said eccentric split venturi to be elastically opposing.

24. A method of improving flow from an axially-rotated valve using a split venturi as described in claim 23, wherein said step of adapting at least one of said portions of said eccentric split venturi to be elastically opposing comprises providing axial pressure to said at least one of said portions of said eccentric split venturi.

25. A method of improving flow from an axially-rotated valve using a split venturi as described in claim 24, wherein said step of providing axial pressure to said at least one of said portions of said eccentric split venturi comprises providing axial compression to said at least one of said portions of said eccentric split venturi.

26. A method of providing improved flow from a valve using a split venturi comprising:
  a. flowing a fluid through a flow path with a pressure and velocity along a central axis wherein said flow path has a flow path periphery;
  b. gradually reducing said pressure of said fluid while increasing said velocity of said fluid through a first portion of a split venturi wherein said first portion is non-axisymmetric relative to said central axis;
  c. gradually increasing said pressure of said fluid while decreasing said velocity of said fluid through a second portion of said split venturi wherein said second portion is non-axisymmetric relative to said central axis;
  d. rotating at least one of said portions of said split venturi to at least a partially closed position, wherein said at least one of said portions is contained within a venturi sleeve periphery which does not extend substantially beyond said flow path periphery;
  e. at least partially restricting said fluid from flowing through said valve;
  f. rotating at least one of said portions of said split venturi to at least a partially open position;
  g. allowing said flowing of said fluid.

27. A method of providing improved flow from a valve as described in claim 26 wherein flowing said fluid comprises flowing through a semicircular eccentric non-axisymmetric flow path.

28. A method of providing improved flow from a valve as described in claim 26 wherein rotating at least one of said portions comprises axially rotating said portion about a longitudinal axis parallel to said central axis.

29. A method of providing improved flow from a valve as described in claim 26 wherein rotating at least one of said portions of said split venturi to at least a partially closed position further comprises axially rotating said second portion relative to said first portion and controlling flowing through said relative rotation.

30. A method of providing improved flow from a valve as described in claim 26 wherein rotating comprises axially rotating while maintaining a fixed longitudinal position of said rotated portion.

31. A method of providing improved flow from a valve as described in claim 26 further comprising at least partially sealing at an interface between said first and second portions.

32. A method of providing improved flow from a valve as described in claim 26 further comprising rotating a second portion longer than a first portion.

33. A method of providing improved flow from a valve as described in claim 26 wherein said rotating at least one of said portions comprises rotating an internal elbow connected to said portion.

34. A method of providing improved flow from a valve as described in claim 26 further comprising exiting said second portion through an exit port and sealing said exit port with an exit port seal at an exit port interface between said exit port and a valve outlet fluidicly connected to said valve.

35. A method of providing improved flow from a valve as described in claim 26 wherein rotating at least one of said portions comprises axially rotating said portion with an axial rotator outside of said flow path without substantial interference with flow efficiency.

36. A method of providing improved flow from a valve as described in claim 26 wherein said flowing said fluid through said flow path comprises flowing through a conduit and further comprising inserting at least one of said portions as a cartridge assembly in said conduit.

37. A method of providing improved flow from a valve as described in claim 26 further comprising sealing at an interface between said portions and assisting said interface with an axial pressure element.

38. A method of providing improved flow from a valve as described in claim 26 further comprising flowing through a length sufficient to substantially eliminate flow separation through said second portion.

39. A method of providing improved flow from a valve as described in claim 26 wherein flowing said fluid comprises flowing through a thermally conductive conduit and further comprising:

a. providing a separation in said thermally conductive conduit in a freezing zone wherein said separation creates a first conduit section and a second conduit section of said conduit; and b. thermally breaking said first conduit section from said second conduit section in a freeze zone.

40. A method of providing improved flow from a valve as described in claim 26 wherein gradually increasing said pressure of said flow while decreasing said velocity of said flow comprises avoiding cavitation of said fluid.

41. A method of providing improved flow from a valve as described in claim 26 further comprising establishing a loss coefficient of 4 or less through said valve.

42. A method of providing improved flow from a valve as described in claim 26 further comprising resisting the freezing of said valve by sealing at said interface a freeze distance away from freezing conditions.

43. A method of improved flow from a valve using a split venturi as described in claim 26, further comprising the step of elastically opposing said valve to pressure forces in an axial direction of said valve.

44. A method of improved flow from a valve using a split venturi as described in claim 43, wherein said step of elastically opposing said valve to pressure forces in an axial direction of said valve comprises elastically opposing to a change in fluid flow.

45. A method of improved flow from a valve using a split venturi as described in claim 44, wherein said step of elastically opposing to a change in fluid flow occurs after a step of rotating at least one of said portions of said split venturi.

46. A method of improved flow from a valve using a split venturi as described in claim 43 or 44, further comprising the step of adapting at least one of said portions of said split venturi to be elastically opposing.

47. A method of improved flow from a valve using a split venturi as described in claim 46, wherein said step of adapting at least one of said portions of said split venturi to be elastically opposing comprises providing axial pressure to said at least one of said portions of said split venturi.

48. A method of improved flow from a valve using a split venturi as described in claim 47, wherein said step of providing axial pressure to said at least one of said portions of said split venturi comprises providing axial compression to said at least one of said portions of said split venturi.

49. A method of providing improved flow from a valve using a split venturi comprising:

a. establishing a flow through a flow path in at least a portion of an axially-rotated valve having a central axis wherein said flow path has a flow path periphery;

b. controlling said flow between a first and second portion of a split venturi wherein said portions are fluidicly connected to said axially-rotated valve;

c. axially rotating at least one of said portions of said split venturi to a rotated position about a longitudinal axis substantially parallel to said central axis to at least a partially closed position;

d. at least partially restricting said flow;

e. axially rotating said rotated portion of said split venturi about said longitudinal axis to at least a partially open position, wherein said rotated portion is contained within a venturi sleeve periphery which does not extend substantially beyond said flow path periphery;

f. continuing said flow through said axially-rotated valve; wherein axially rotating said portions of said split venturi comprises axially rotating said portion with an axial rotator outside of said flow without substantial interference with flow efficiency.

50. A method of providing improved flow from a valve as described in claim 49 further comprising interfering with less than 20% of a flow efficiency through said flow path by said axial rotator.

51. A method of providing improved flow from a valve as described in claim 49 wherein controlling said flow further comprises flowing through an eccentric split venturi.

52. A method of providing improved flow from a valve as described in claim 31 wherein flowing through said eccentric split venturi comprises flowing through a semicircular eccentric split venturi.

53. A method of providing improved flow from a valve as described in claim 49 wherein axially rotating said rotated portion of said split venturi comprises axially rotating to align with the other said portion of said split venturi for full flow.

54. A method of providing improved flow from a valve as described in claim 49 wherein flowing said fluid through a flow path comprises flowing with a pressure and velocity and further comprising:

a. gradually reducing said pressure of said fluid while increasing said velocity of said fluid through said first portion of said split venturi;

b. gradually increasing said pressure of said fluid while decreasing said velocity of said fluid through said second portion of said split venturi; and c. avoiding substantial flow separation of said fluid in at least said second portion.

55. A method of providing improved flow from a valve as described in claim 49 further comprising establishing a loss coefficient of 4 or less through said axially-rotated valve.

56. A method of providing improved flow from a valve as described in claim 49 further comprising sealing at an interface between said portions comprising:

a. sealing about a periphery of said interface between said portions;

b. sealing across a diametrical portion of said interface in the same plane as said sealing about said periphery.

57. A method of providing improved flow from a valve as described in claim 49 further comprising exiting one of said portions through an exit port comprising exiting through an internal elbow to a valve outlet fluidicly connected to said axially-rotated valve.

58. A method of providing improved flow from a valve as described in claim 57 further comprising sealing at said exit port between said internal elbow and said valve outlet.

59. A method of providing improved flow from a valve as described in claim 49 wherein said flowing through said flow path comprises flowing through a conduit and further comprising inserting at least one of said portions as a cartridge assembly in said conduit.

60. A method of providing improved flow from a valve as described in claim 59 further comprising sealing said cartridge assembly in said conduit.

61. A method of providing improved flow from a valve as described in claim 49 further comprising sealing at an interface between said portions and resisting the freezing of said axially-rotated valve by sealing at said interface a freeze distance away from freezing conditions.

62. A method of providing improved flow from a valve using a split venturi as described in claim 49, further comprising the step of elastically opposing said axially-rotated valve to pressure forces in an axial direction of said axially-rotated valve.

63. A method of providing improved flow from a valve using a split venturi as described in claim 62, wherein said step of elastically opposing said axially-rotated valve to pressure forces in an axial direction of said axially-rotated valve comprises elastically opposing to a change in fluid flow.

64. A method of providing improved flow from a valve using a split venturi as described in claim 63, wherein said step of elastically opposing to a change in fluid flow occurs after a step of axially rotating said at least one of said portions of said split venturi.

65. A method of providing improved flow from a valve using a split venturi as described in claim 62 or 63, further comprising the step of adapting at least one of said portions of said split venturi to be elastically opposing.

66. A method of providing improved flow from a valve using a split venturi as described in claim 65, wherein said step of adapting at least one of said portions of said split venturi to be elastically opposing comprises providing axial pressure to said at least one of said portions of said split venturi.

67. A method of providing improved flow from a valve using a split venturi as described in claim 66, wherein said step of providing axial pressure to said at least one of said portions of said split venturi comprises providing axial compression to said at least one of said portions of said split venturi.

68. A method of providing improved flow from a valve using a split venturi comprising:
   a. flowing a fluid with a pressure and velocity into an axially-rotated valve having a central axis in a flow path having a flow path periphery;
   b. gradually reducing said pressure of said fluid while increasing said velocity of said fluid in a first portion of a split venturi;
   c. gradually increasing said pressure of said fluid while decreasing said velocity of said fluid in a second portion of a split venturi comprising avoiding flow separation of said fluid in said second portion;
   d. axially rotating at least one of said portions of said split venturi along a longitudinal axis substantially parallel to said central axis to at least a partially closed position, wherein said at least one of said portions is contained within a venturi sleeve periphery which does not extend substantially beyond said flow path periphery;
   e. at least partially restricting said fluid from flowing through said axially-rotated valve;
   f. axially rotating said rotated portion along said longitudinal axis to at least a partially open position;
   g. allowing said flowing of said fluid.

69. A method of providing improved flow from a valve as described in claim 68 wherein axially rotating at least one of said portions of said split venturi comprises axially rotating said second portion.

70. A method of providing improved flow from a valve as described in claim 68 wherein avoiding flow separation of said fluid in said second portion comprises providing a streamlined flow slope surface.

71. A method of providing improved flow from a valve as described in claim 68 wherein gradually increasing said pressure of said fluid while decreasing said velocity of said fluid in said second portion comprises gradually increasing through a slope of approximately 7–8 degrees in said portion.

72. A method of providing improved flow from a valve as described in claim 68 further comprising planar sealing between said first and second portions of said split venturi with an outer periphery seal and a diametrical seal in substantially the same plane as said outer periphery seal.

73. A method of providing improved flow from a valve as described in claim 68 wherein gradually increasing said pressure comprises gradually increasing in a non-axisymmetric flow path relative to said central axis.

74. A method of providing improved flow from a valve as described in claim 73 wherein gradually reducing said pressure comprises gradually reducing in a non-axisymmetric flow path relative to said central axis.

75. A method of providing improved flow from a valve as described in claim 74 wherein non-axisymmetric flow paths comprise semicircular eccentric non-axisymmetric flow paths.

76. A method of providing improved flow from a valve as described in claim 68 wherein gradually increasing said pressure comprises gradually increasing said pressure while maintaining streamlined flow.

77. A method of providing improved flow from a valve as described in claim 76 wherein gradually reducing said pressure comprises gradually reducing said pressure while maintaining streamlined flow.

78. A method of providing improved flow from a valve as described in claim 77 wherein gradually reducing said pressure comprises all reducing said pressure while maintaining non cavitation flow.

79. A method of providing improved flow from a valve as described in claim 68 wherein gradually reducing said pressure comprises gradually reducing said pressure while maintaining non cavitation flow.

80. A method of providing improved flow from a valve as described in claim 68 further comprising establishing a loss coefficient of 4 or less through said axially-rotated valve.

81. A method of providing improved flow from a valve as described in claim 68 further comprising at least partially sealing at an interface between said portions.

82. A method of providing improved flow from a valve as described in claim 81 wherein sealing at said interface comprises linearly sealing across a diametrical portion of said interface.

83. A method of providing improved flow from a valve as described in claim 81 wherein sealing at said interface comprises curlinearly sealing across a diametrical portion of said interface.

84. A method of providing improved flow from a valve as described in claim 81 wherein sealing with a cross sectional seal area to maintain a seal against full pressure.

85. A method of providing improved flow from a valve as described in claim 68 further comprising reducing a flow area of said flow path at an interface between said first and second portions to not less than approximately 40% relative to said flow area in a full cross sectional area of said flow path.

86. A method of providing improved flow from a valve as described in claim 68 further comprising flowing through a longer flow path in said second portion than said first portion.

87. A method of providing improved flow from a valve as described in claim 68 further comprising flowing through an interface between said first and second portion wherein said first and second portions at said interface comprises an approximately zero slope.

88. A method of providing improved flow from a valve as described in claim 68 wherein rotating at least one of said portions comprises axially rotating said portion with an axial rotator outside of said flow path without substantial interference with flow efficiency.

89. A method of providing improved flow from a valve as described in claim 68 wherein rotating said second portion comprises axially rotating said portion with an axial rotator outside of said flow path without substantial interference with flow efficiency.

90. A method of providing improved flow from a valve using a split venturi as described in claim 68, further comprising the step of elastically opposing said axially-rotated valve to pressure forces in an axial direction of said axially-rotated valve.

91. A method of providing improved flow from a valve using a split venturi as described in claim 90, wherein said step of elastically opposing said axially-rotated valve to pressure forces in an axial direction of said axially-rotated valve comprises elastically opposing to a change in fluid flow.

92. A method of providing improved flow from a valve using a split venturi as described in claim 91, wherein said step of elastically opposing to a change in fluid flow occurs after a step of axially rotating at least one of said portions of said split venturi.

93. A method of providing improved flow from a valve using a split venturi as described in claim 90 or 91, further comprising the step of adapting at least one of said portions of said split venturi to be elastically opposing.

94. A method of providing improved flow from a valve using a split venturi as described in claim 93, wherein said step of adapting at least one of said portions of said split venturi to be elastically opposing comprises providing axial pressure to said at least one of said portions of said split venturi.

95. A method of providing improved flow from a valve using a split venturi as described in claim 94, wherein said step of providing axial pressure to said at least one of said portions of said split venturi comprises providing axial compression to said at least one of said portions of said split venturi.

* * * * *